Figure 10:
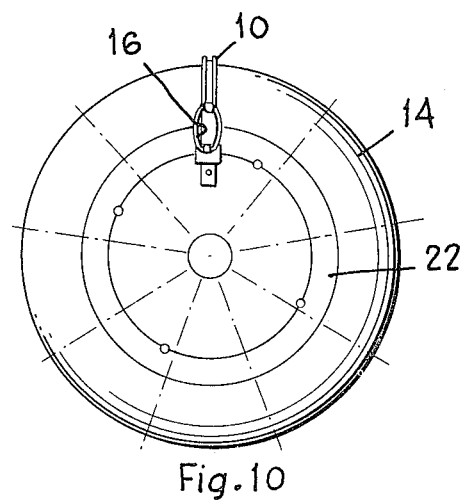

United States Patent [19]

Mezzacapo

[11] 3,996,984
[45] Dec. 14, 1976

[54] DEVICE FOR IMPROVING THE ADHESION OF THE WHEELS OF A VEHICLE

[76] Inventor: Filippo Mezzacapo, Corso Vittorio, 320, Velletri, Italy

[22] Filed: Apr. 24, 1975

[21] Appl. No.: 571,295

[30] Foreign Application Priority Data

May 6, 1974 Italy ................................. 50791/74
Feb. 17, 1975 Italy ................................. 48214/75

[52] U.S. Cl. ........................... 152/225 R; 152/219
[51] Int. Cl.² ........................................ B60C 27/20
[58] Field of Search .................... 152/178–186, 152/191, 225–230, 218, 219

[56] References Cited

UNITED STATES PATENTS

| | | | |
|---|---|---|---|
| 2,528,165 | 10/1950 | Nickerson | 152/226 |
| 2,598,851 | 6/1952 | Spevak | 152/225 X |
| 2,806,503 | 9/1957 | Hamerski | 152/225 |
| 2,873,783 | 2/1959 | O'Higgins | 152/225 X |
| 3,045,738 | 7/1962 | Lombardi | 152/225 |
| 3,079,972 | 3/1963 | Forman | 152/225 X |
| 3,132,682 | 5/1964 | Fox | 152/230 X |
| 3,380,779 | 4/1968 | Albright | 152/225 X |
| 3,847,196 | 11/1974 | Gomez | 152/226 |

*Primary Examiner*—Drayton E. Hoffman
*Attorney, Agent, or Firm*—Mason, Fenwick & Lawrence

[57] ABSTRACT

A device for improving the traction of the wheels of a vehicle in the presence of snow and ice on a road surface, said device including a series of spikes arranged on the exterior periphery of the wheel in contact with the tread of the type with the spikes connected to the hub of the wheel.

1 Claim, 15 Drawing Figures

U.S. Patent  Dec. 14, 1976  Sheet 1 of 2  3,996,984
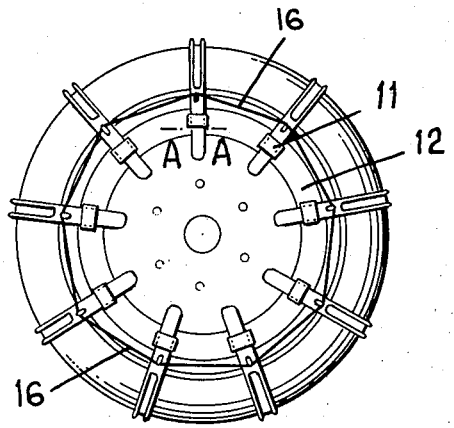
Fig. 1
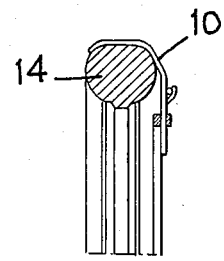
Fig. 3
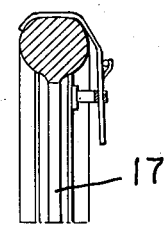
Fig. 8
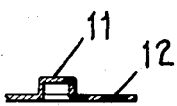
Fig. 4
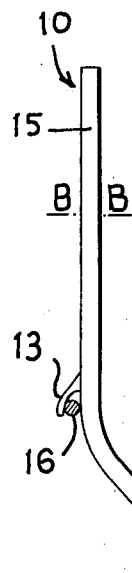
Fig. 2
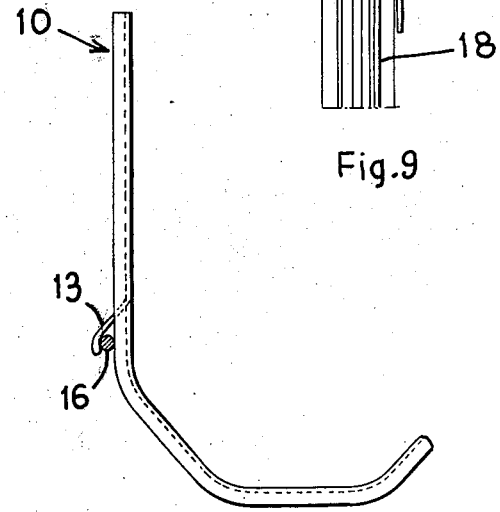
Fig. 9
Fig. 7
  
Fig. 5  Fig. 6

U.S. Patent  Dec. 14, 1976  Sheet 2 of 2  3,996,984

DEVICE FOR IMPROVING THE ADHESION OF THE WHEELS OF A VEHICLE

It is well known that when a vehicle is running on a snow and/or ice-surfaced road, the vehicle is inclined to skid on the road surfacing, therefore in these circumstances, the driving of the vehicle becomes difficult and tiring. Furthermore, in some situations it is difficult to stop the vehicle as a consequence of the skating of the vehicle driving wheels on the ground.

It is also well known that many devices have the purpose of increasing the adhesion between the wheel and the road surfacing, when in presence of a snow and/or ice covered road. Said devices range from the so called snow-tires to the so-called skid-chains.

However, the known systems are suitable only when the vehicle must run in a continuous way and for some time over snow and/or covered roads. Installing chains is particularly hard and not always easy to carry out, particularly in the uncomfortable conditions, in which such a work is usually done. More particularly, the stretching of a chain ring on the inner side of the wheel is difficult and uncomfortable. Additionally, it is nearly impossible to install and remove the chain-assembly during the night hours.

It is therefore the primary object of the present invention to provide a new and improved traction device for vehicles.

It is an additional object of the present invention to provide a device having the purpose of increasing the adhesion of the wheels of a vehicle, in the presence of snow or ice, on the road, in which a series of spikes is arranged on the exterior periphery of the wheel in contact with the tread of the tire, the said spikes being connected to the center of the wheel.

In an alternate embodiment of the present invention, the rectilinear length of the spike is given a slant in the direction of the inner, or the outer, side of the tire. This slant causes the components of the forces acting on the spike during its work and therefore during its laying on the ground, to be at least partially unloaded, without stressing a disk or the spikes.

To this purpose, the disc on which are provided the ways for the spike is conveniently frustum shaped which provides the disc a greater strength.

The resultant forces on the spikes are operating as quite balanced relative to the tire therefore they do not produce special wear of the tire.

A further object of the present invention is to provide a stopping device for restricting the travel of the spike in the centrifugal direction.

Additionally the element used to constrain the spike, against the centrifugal force, cannot be the same for all the spikes. The restraint device may be elastic or inelastic and may be continuous or discontinuous, i.e., comprise all the spikes or a portion of the spikes, in such a way as to restrain the spikes together.

Figure 11:
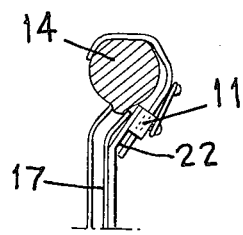
Figure 13:
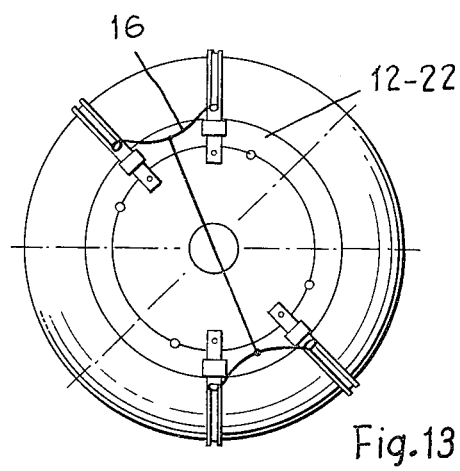
Figure 12:
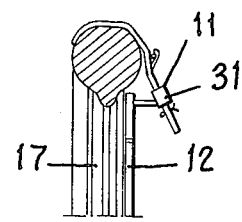
Figure 14:
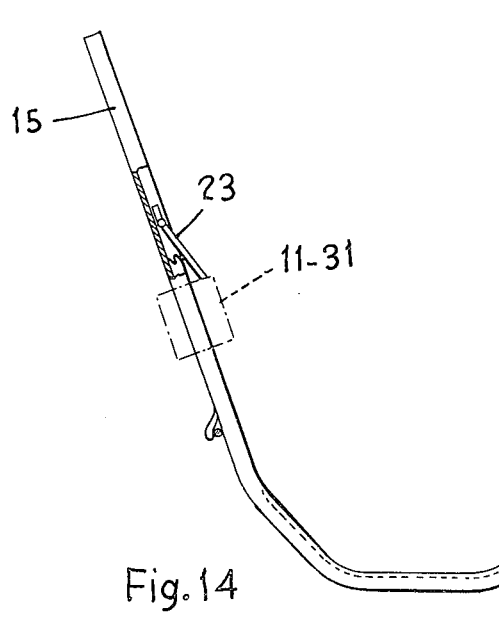
Figure 15:
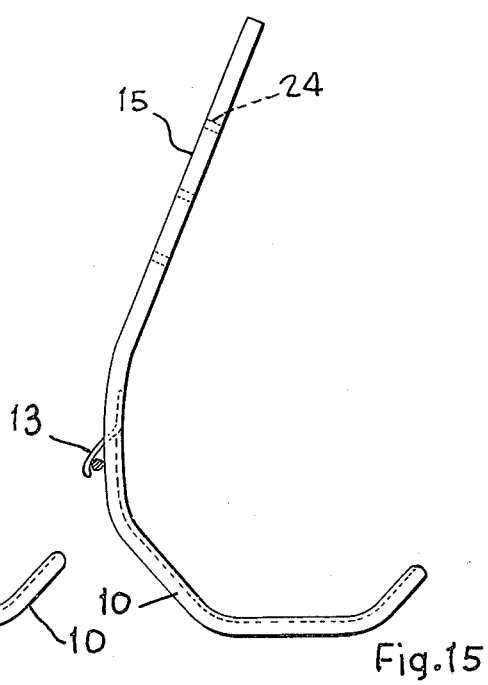

These and other objects of the present invention will appear more clearly from the following detailed specification making reference to the attached drawing in which:

FIG. 1 shows a wheel, with the applied device;
FIG. 2 shows one of the spikes of the device;
FIG. 3 shows a partial sectional view of the device as attached to a wheel;
FIG. 4 shows a section along the line A—A of the FIG. 1;
FIGS. 5 and 6 show the sections along the lines B—B and C—C of the FIG. 2;
FIG. 7 shows a modification of the spike in the FIG. 2;
FIGS. 8 and 9 show some modifications of the device in the present invention;
FIG. 10 shows a frontal view of a wheel provided with spikes;
FIG. 11 shows diagrammatically the attachement, along a section, of a spike sloped toward the inner of the wheel
FIG. 12 is similar to FIG. 11 but with the slope of the spike outward from the vehicle;
FIG. 13 shows a type of discontinuous connection of the spikes, made considering groups of spikes; and
FIGS. 14 and 15 show two different solutions for a stoppage device of the spike against the centrifugal force and for simultaneously impressing a centripetal thrust on the spike.

With reference to the drawings and more particularly to the FIG. 1, the device, of the present invention includes a series of spikes 10, sliding within ways 11 connected to a disc 12. Each spike 10 has a rectilinear length 15 with a protuding tongue 13, and a curved length, that encloses the tire-tread 14 of the vehicle. As shown in the FIG. 3, the tongue turns slightly downward on the inner side of the wheel. Therefore, each spike forms a traction member across the tread similar to the usual chain systems.

The rectilinear length 15 of any spike 10 is slidable within the way 11, which is carried by a disc 12 and by symmetrically positioning the succession of the different spikes the ring is balanced in its center, relative to the wheel and applied on the exterior side of the wheel.

As previously stated, each spike 10 is provided with a tongue 13 which retains an elastic element 16 which passes through the tongues on all the spikes on the periphery of the wheel. Therefore, said spikes 10 will stick with their curved length on the tread of the tire 14 and will be held by said elastic element 16 which pulls the spikes toward the center of the wheel. Using such an arrangement, the different spikes can slide within their respective ways 11 and the tire deformation as it contacts the road.

As shown in FIGS. 5 and 6, the rectilinear length 15 of spike 10 can be of solid material, whereas, in the lower part extending across the tread it has a C-shaped section.

As previously said, the disc 12 is provided with ways 11 for the spikes which may be welded on the disc 12. The ways 11 can be obtained through punching from the disc 12 in such a way as to allow the transverse sliding within the same of the rectilinear length 15 of the spike 10.

Having in mind what has been previously said, the spike 10 can be made, as shown in the FIG. 7, using a section, for example, having a C-section, from which the tongue 13 is obtained by shearing. Also in this case it is possible to obtain a great saving in the manufacturing expenses as all of the workings are shearing the drawing.

As shown in FIGS. 8 and 9, the circle 12 can be eliminated and the ways 11 can be applied directly on the rim 17 of the wheel or be obtained on the hub cap 18.

An important feature of the present invention is the elastic element 16. Indeed, as shown in FIGS. 1, 6 and 7, the element 16 clasps the tongue 13 on the spike 10, and as consequence of its elasticity, applies a centripetal force to the spike, which forces the spike against the surface of the tread. The element 16, as already mentioned, can be a single elastic element or a rigid cable with elastic elements, that are interposed in suitable positions. The tongue 13, in addition to being the clasping element of the elastic element 16, represents also an end-stop of the spike 10 against the way 11. The ways 11 are spaced from the tongue 13 when the spike is in the assembled condition so the tongue does not touch the way, except following the complete deflation of the tire.

In the modification, shown at the FIGS. 10 and 13 the disc or ring in the FIG. 1 is replaced with a ring 22 having conical shape, therefore the respective ways are sloped relative to the vertical. The slope of the ring 22, and the ways 31 causes the rectilinear length 15 of the spikes 10 to be sloped relative to the vertical.

Assembly is achieved as follows:

The disc 12 is positioned adjacent the wheel as shown in FIGS. 1 and 3 with the spikes extending around the tire 6 except that portion of the tire in contact with the ground. The elastic element 16 is positioned in the tongues 13 as shown in FIG. 1. The vehicle is moved slightly forward and the remaining spikes are slid into position. The elastic element 16 then assumes the shape of a regular polygon, having as many sides as spikes with each spike representing the vertex of two contiguous sides. Disassembly is achieved by removing the elastic element 16 from the tongues 13 and sliding the spikes out of the ways 11 and storing them with the disc 12 and elastic member 16.

As already mentioned, the slope of the ring 22 or of the ways 31 will be directed at least, close to the resultant of the forces, that are acting on the curved length of the spike 10.

Such an arrangement permits the rectilinear length 15 to slide pratically without friction within the ways 11 or 31, with the consequence of reducing or zeroing the stresses on the disc 12 or ring 22. The conical shape of the ring 22 allows a greater strength as a consequence of its shape and therefore allows the use of a lighter and more economical material.

During testing, it was observed that the tying device 16 is effective in the case of the light vehicles. For heavy vehicles it may be necessary to utilize a tying device which incorporates inelastic members such as cables connecting a portion or all of the spikes.

As shown in FIGS. 10 and 13, the spikes can be tied whether individually (FIG. 10) or in groups (FIG. 13) and can be connected in pairs or in a greater number.

A consequence of breaking the elastic member between the spike 10 and the disc ring is the possibility that during the running of the vehicle, the spike will be subjected to centrifugal force and therefore will slide out of the ways 11 or 13. To prevent this from happening as shown in the FIGS. 14 and 15, the rectilinear length 15 of the spike is provided with a latching system 23 comprising a lever, or, pawl, urged to protrude out of line with the rectilinear length 15 when the spike is in its working position, against the edge of the way 11 or 31. To remove the spike from the disc it is sufficient to release the latch 23 in such a way that the rectilinear length 15 can slide freely within the ways 11 or 31. A similar result could be obtained through adding holes 24 in the rectilinear length 15 as shown in FIG. 15 and disposing within the holes a pin or blocking split pin, or other convenient mean. The pin produces a stop which abuts against an edge of ways 11 or 31.

The disc 12 or ring 22 may be constrained by only the rectilinear length 15 of the spikes or they may be fixed to the wheel by any suitable system as, for example, by expanding jaws, by locking the disc or ring on the studs of the wheel, or by locking the disc or rings on pins mounted for this purpose on the rim 17. Locking the disc or ring to the wheel is of course preferable for industrial vehicles which are subject to frequent use.

If necessary, the inner surface of the spike 10 can be provided with means suitable for providing traction between the spike surface and tread of the tire in such a way to prevent or hinder a possible mutual sliding.

The present invention provides an extremely simple way of assembling and disassembling. The spikes 10, as consequence of the groove on the side facing the road surface, or as a consequence of their projection on the tread of the tire, provides grip of the wheel in snow. The spikes 10 can be also equipped with nails when it would be necessary to operate on a road surface covered not only by the snow, but also by ice.

In the present invention, each spike is free to move radially in the elastic element 16 provides a biasing force to prevent the spike from leaving the tread.

In the foregoing detailed description, it will be evidenced that there are a number of changes, adaptations, modifications of the present invention which come within the province of those skilled in the art. However, it is intended that all such variations not departing from the spirit of the invention be considered as within the scope thereof as limited solely by the appended claims.

Therefore, for example, the elastic, or unelastic tying device 16 can be connected anywhere on the spike, i.e., also on the rectilinear length.

I claim:

1. A device for improving the traction of the tread of a wheel on a vehicle in the presence of snow or ice on a road, said device comprising a disc member having a diameter smaller than the diameter of the wheel and positionable adjacent the exterior side of the wheel, radial ways spaced apart on the disc member, spikes radially slidable in the ways and extending across at least a portion of the tread, elastic means for biasing the spikes toward the center of the ring thereby causing the spikes to contact the tread, and releasable means for preventing the spike from moving outwardly away from contact with the tread of the wheel if the elastic member breaks and for permitting removal of the spikes from the device for easy storage, said spike extends radially inward beyond the way when the device is mounted on the wheel and said releasable means includes stop members attachable to each of the spikes on a portion of the spike extending radially inward from the ways and includes an abutment means on the disc member adjacent which the stop member abuts to prevent the spike from moving out of contact with the tread.

* * * * *